J. FOSTER.
Attaching Wheels to Axles.

No. 6,608 Patented July 24, 1849.

UNITED STATES PATENT OFFICE.

JUNIUS FOSTER, OF BRIDGEPORT, CONNECTICUT.

CONNECTING HUBS WITH AXLES.

Specification of Letters Patent No. 6,608, dated July 24, 1849.

*To all whom it may concern:*

Be it known that I, JUNIUS FOSTER, of Bridgeport, in the county of Fairfield and State of Connecticut, have invented a new and useful Improvement in Methods of Holding Carriage-Wheel Hubs Onto Axles, and that the following is a full, clear, and exact description of the principle or character which distinguishes them from all other things before known and of the manner of making, constructing, and using the same, reference being had to the accompanying drawings, making part of this specification, in which—

Figure 4:
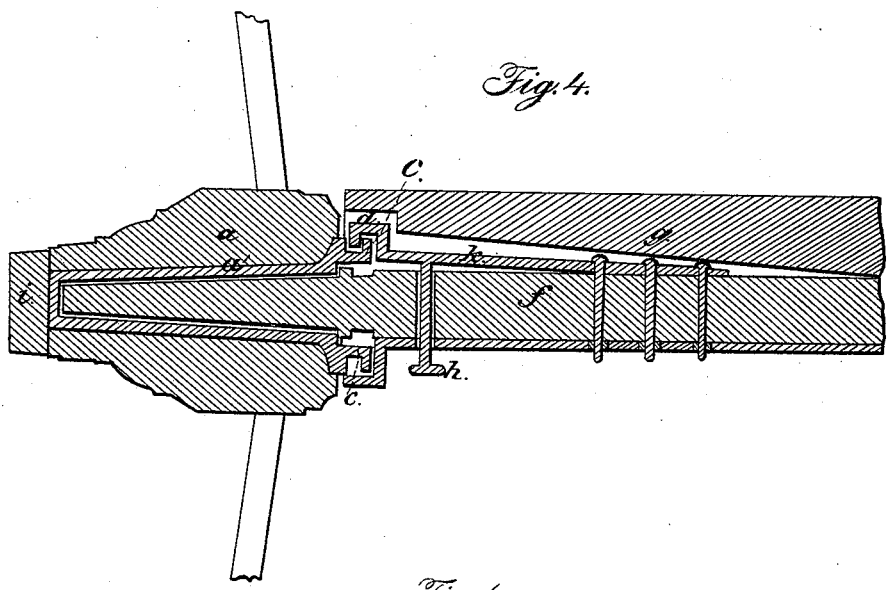
Figure 1:
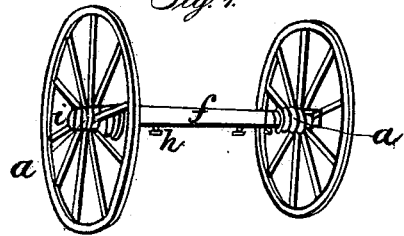
Figure 2:
Figure 3:
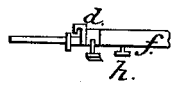

Figure 1 is a perspective view of an axle with the two wheels on it; Fig. 2, an elevation of one of the wheels and hub; Fig. 3, an elevation of a part of the axle; and Fig. 4, a longitudinal vertical section of the axle and wheel.

The same letters indicate like parts in all the figures.

The nature of my invention consists in fastening the hubs of carriage wheels onto their axles by means of a spring catch which fits in a groove made in the inner end of the hub, the said catch being on the end of a spring attached to the top of the axle and provided with a pin which passes through a hole in the axle and extending to a sufficient distance below it to admit of forcing up the catch out of the groove in the hub for the purpose of taking off the wheel.

In the accompanying drawings (*a*) represents the hub of the wheel properly and in any desired manner secured to the metal pipe box (*a′*) which at the inner end extends out sufficiently beyond the wood of the hub to admit of forming a groove (*c*) in it to receive the end of a catch or segment collar (*d*), by which the hub is held in its place on the axle and free to turn thereon. This catch or segment collar is a projection on the end of a spring (*k*) the end of which is properly secured to the top of the metal part of the axle (*f*), the wood sheathing (*g*) of the said axle being extended over the spring as a covering and so formed as to give to the spring the required vertical play for liberating the hub. A pin (*h*) projects from the under surface of the spring and passes freely through a hole in the iron axle and so far below it as to admit of forcing up the catch or segment collar out of the groove of the pipe box. In practice the best mode of effecting this is to place the head of a jack under the pin (*h*) so that in the act of lifting the wheel from the ground the catch or segment collar will be lifted out of the groove and thereby liberate the hub to admit of removing the wheel. A cap piece (*i*) is attached to the axle which surrounds that part of the pipe box which projects beyond the hub to prevent mud, sand and other impurities from entering.

By my improvement all the labor heretofore required for effecting the liberation of the hub from the axle is avoided; and as all the modes heretofore adopted for connecting the hub with the axle by means of segment collars have had the collar secured by screw bolts and nuts, which become rusted, much labor heretofore unavoidable is saved.

Another advantage which my improvement possesses over all other plans heretofore known for this purpose, is the perfect security of the connection which depends entirely on the tension of the spring, for when the collar is secured to the axle by screw nuts they are liable to be unscrewed by the motions of the carriage, and if they are screwed on so tight as to avoid this then after being slightly rusted it becomes very difficult to remove them for taking off the wheels.

I do not claim as my invention securing the hubs of carriage wheels to their axles by means of a catch or segment collar fitting in a groove of the hub or pipe box, as this has long since been known; but What I do claim as my invention and desire to secure by Letters Patent is—

Securing the hub of a carriage wheel to its axle by means of a catch or segment collar fitting in a groove of the hub or pipe box in combination with the spring connection of the said segment collar, and the pin or other projection passing down below the axle, substantially as described to admit of disconnecting the collar in lifting up the wheel, as described.

JUNIUS FOSTER.

Witnesses:
DWIGHT MORRIS,
ELI THOMPSON.